Nov. 14, 1967     J. J. BOYD     3,352,607
HYDRO-GASEOUS BEARING
Filed May 4, 1966

INVENTOR

JOSEPH J. BOYD

Semmes & Semmes
ATTORNEYS

United States Patent Office 3,352,607
Patented Nov. 14, 1967

3,352,607
HYDRO-GASEOUS BEARING
Joseph J. Boyd, Atlanta, Ga.
(96 Elder St., Fairburn, Ga. 30213)
Filed May 4, 1966, Ser. No. 547,507
18 Claims. (Cl. 308—9)

The present invention is concerned with the problem of bearing lubrication. More particularly, it combines the principles of liquid and gaseous lubrication to provide bearings having the best features of both. This invention therefore provides bearings having the rigidity of the hydrodynamic or hydrostatic bearing, while having the lower friction of the pneumostatic or pneumodynamic bearing. Further, there is no self-contamination or deterioration of the lubricant.

The bearing provided by this invention is a high temperature bearing which operates far above the temperature range of other bearings. It produces close tolerance, low friction bearings, the life thereof being independent of fatigue, galling and other high temperature bearing disadvantages. This is accomplished by utilizing the spheroidal state of properties of liquids, which is also known as Leidenfrost's phenomena.

It is therefore an object of invention to utilize the properties of liquids in the spheroidal state, to provide a hydro-gaseous bearing, which is free of the high temperature disadvantages of conventional bearings.

It is another object of invention to provide a bearing having the rigidity of the hydrodynamic or hydrostatic bearing, while having the friction of the pneumostatic or pneumodynamic bearing.

It is a further object of invention to provide a bearing wherein there is no self-contamination or deterioration of the lubricant.

These and other objects of invention will be apparent from the following specification and drawings in which.

The principle of operation of my disclosed bearings depends upon the temperature relationship between the journal and the boiling point of the lubrication liquid; or between the bearing shell and the boiling point of the liquid; or between both the shell and journal and the boiling point of the liquid.

In the spheroidal state, when a liquid is brought into close proximity to a hot surface having a temperature materially above the boiling point of the liquid, a steam interface or vapor interface is formed between the hot surface and the liquid. This prevents the liquid from actually contacting the hot surface. The interface created is quite thin, and as it escapes from the area between the surface and the liquid, its place is filled by newly created vapor produced by the radiant heat of the hot surface.

This process continues as long as the temperature difference is high enough, and the pressure is low enough, to prevent the liquid from touching the surface. Should actual contact be made, rapid heat transfer takes place, vaporizing the liquid. While in the spheroidal state, the liquid absorbs very little heat, and it is therefore possible to keep a liquid such as water in spheroidal contact with a hot material such as red hot steel or other metals, for a long period of time.

In the application of this phenomena, two flat surfaces or slides for linear motion, or a bearing shell and journal for rotary motion, are arranged to confine the liquid so as to supply the supporting pressure, and the hot slide or journal vaporizes the surface to effect the spheroidal state. The very thin film of steam acts as a gas bearing, supporting the journal or slide in an almost frictionless manner. The relative incompressibility of the liquid backing it up makes the bearing rigid and increases the load carrying ability.

The bearing can comprise numerous types and forms, depending upon its use, since the principle involved in my invention primarily involves the temperature of the parts, and the boiling point of the lubricant. Probably the most common form of bearing would be that shown in FIGURES 1 and 2. This is basically a hydrostatic type bearing; however, the steam interface created between the hot shaft and the liquid, converts it into a hydro-gaseous bearing.

Figure 2:
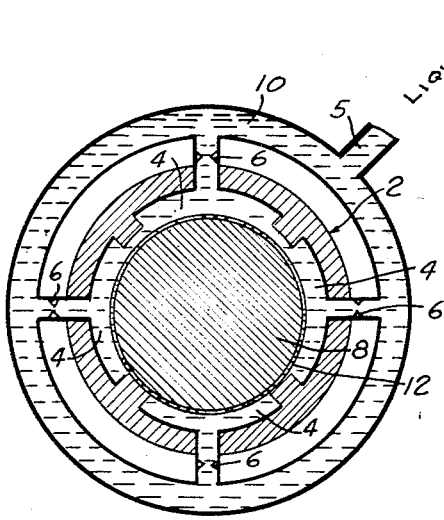
FIGURE 2 is a section view of FIGURE 1 taken along the section lines 2—2.
Figure 1:
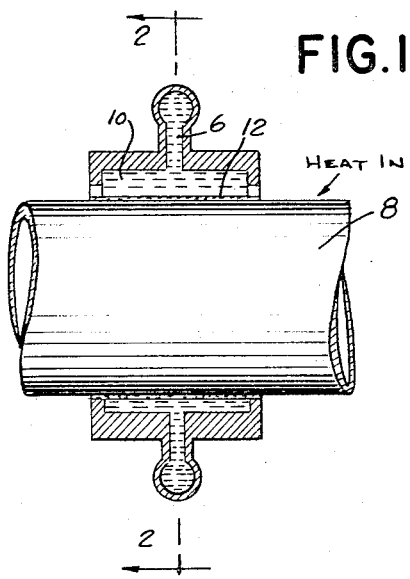
FIGURE 1 is a partial sectional view of a bearing shell and shaft utilizing the principles of my invention.

In FIGURE 1, bearing shell 2 defines pockets 4. Pressure is maintained on each pocket, by orifices 6 which allow only a limited volume of liquid to flow. Liquid enters through liquid input 5. When shaft 8 is centered, all pockets have the same pressure. However, when shaft 8 is eccentric as illustrated in FIGURES 1 and 2, less of liquid 10 escapes from the closed pocket, in this case the lower pocket. Therefore, the pressure builds up in this pocket, and drops in the others. This difference in pressures supports the load.

In the hydrostatic bearing disclosed in FIGURES 1 and 2, the shaft 8 has a temperature above the boiling point of liquid 10, thereby forming a thin layer of steam interface 12. This layer of steam acts as an insulator maintaining a separation between the hot shaft and the liquid, and prevents a rapid loss of heat to the liquid. As steam escapes along with the liquid flowing through the bearing, more is formed to take its place; however, the volume is small considering the difference in temperature as well as cooling ability of the liquid.

Figure 3:
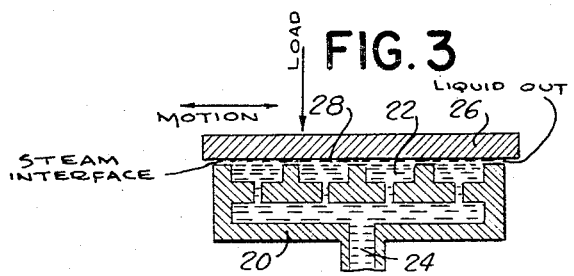
FIGURE 3 is a sectional view of still another bearing, wherein the liquid is maintained under pressure in pockets defined by the bearing base.

FIGURE 3 illustrates another form of a bearing, which may be utilized. Therein, a flat surface 20 defining pockets 22, which is filled with a liquid under pressure through liquid input 24 is illustrated. Slide 26, moves back and forth across the top surface of bearing base 20, the load being applied as indicated. Slide 26 is of sufficiently high temperature, so that a steam interface 28 is created to support the load.

Figure 4:
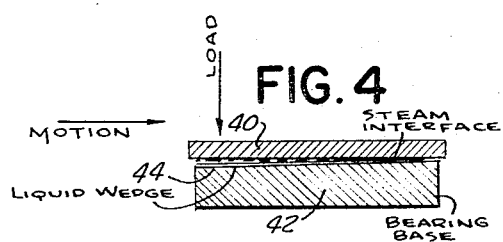
FIGURE 4 is another example of the bearing, wherein the liquid comprises a wedge on the surface of the bearing base.

FIGURE 4 illustrates flat surface 20, which slides across bearing base 42. A liquid wedge 44 which is extremely narrow, is formed on the top surface of the bearing base 42, and the motion of the metal surface at a sufficiently high temperature draws in liquid and creates steam interface 46 to support the load as indicated.

Figure 5:
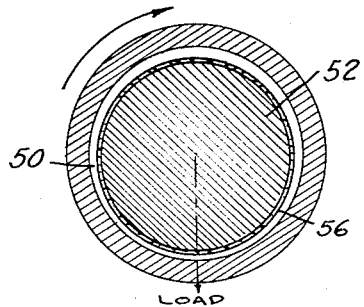
FIGURE 5 is a sectional view of yet another type of bearing wherein the lubricating wedge of liquid is built up by the rotating shaft.

Finally, FIGURE 5 illustrates a hydro-gaseous dynamic bearing wherein the lubricating liquid wedge 50 is built up by the rotation of shaft 52. The shaft is of sufficient temperature to create steam layer or interface 56. It is therefore similar to the bearing disclosed in FIGURES 1 and 2, except in FIGURE 5, the flow of liquid is maintained by the rotation of the shaft and would therefore break down when the shaft is at rest, allowing metal to metal contact.

It must be understood that all references to high temperatures are relative, and that the bearing journal might operate at room temperature or even below 0° as long as its temperature is sufficiently above the boiling point of the liquid, so as to bring it to the spheroidal state.

Also, in the stated examples, the liquid formed a steam interface against a shaft and wet the housing; however, this construction could be reversed with the bearing shell hot and the liquid wetting the shaft.

Further, the housing and shaft could both be hot, and form a steam interface completely around the liquid. In this latter case, a liquid such as water could be pumped through a red hot bearing, to support a red hot shaft, and thereby supply almost frictionless lubrication for high speed rotation for extended periods, without damage to the bearings.

Also, this invention is not limited to the type of bearings shown. The principle is equally applicable to thrust, cone, slide or radical bearings, or any combination of these, and would further support light loads if operating on a ball or roller bearing.

Having thus described my invention, I claim the following:

1. A hydro-gaseous bearing which comprises:
   (A) two co-acting surfaces;
   (B) a liquid between said two surfaces, the temperature of one of said surfaces being such as to heat the liquid to the spheroidal state, thereby forming a vapor interface between it and said liquid to provide relatively frictionless lubrication between the two surfaces.

2. A hydro-gaseous bearing which comprises:
   (A) an outer shell;
   (B) a rotatable journal to which a load is applied;
   (C) a liquid between said outer shell and said journal; the temperature of at least one of said outer shell and said journal being such as to heat the liquid to the spheroidal state, thereby forming a vapor interface between it and said liquid providing relatively frictionless lubrication between said outer shell and said journal.

3. The bearing as described in claim 2, wherein said journal is eccentrically positioned with regard to said outer shell, said outer shell and said journal defining a plurality of individual pockets between them, the pressure of liquid contained in said pockets being unequal because of the eccentricity of said journal.

4. The bearing as described in claim 3, wherein the eccentricity between the journal and the lowermost pocket throttles the liquid flow and thereby builds up sufficient pressure to support the load.

5. The bearing as described in claim 4, wherein the liquid is fed through a liquid input means under pressure to provide support for the load.

6. The bearing as described in claim 5, wherein the temperature of said journal is sufficient to create a vapor interface between the liquid and the journal.

7. The bearing as described in claim 2, wherein said journal is eccentrically positioned towards the lowermost position of said shell.

8. The bearing as described in claim 7, wherein a flow of liquid is maintained by rotation of said journal, the temperature of said journal being sufficient to create a vapor interface between the liquid and the journal, the pressure buildup being greatest at the lowermost journal position to suppport the load.

9. A hydro-gaseous bearing which comprises:
   (A) a bearing base;
   (B) a sliding flat surface to which a load is applied;
   (C) a liquid between said bearing base and said sliding flat surface, the temperature of one of said sliding flat surface and said bearing base being sufficient to heat the liquid to the spheroidal state thereby forming a vapor interface between it and said liquid, to provide relatively frictionless lubrication between the bearing base and the flat surface.

10. The hydro-gaseous bearing as described in claim 9, wherein said liquid comprises a film on said bearing base.

11. The hydro-gaseous bearing as described in claim 9 wherein said bearing base defines a plurality of pockets, said pockets being filled with the liquid under pressure to support the load on said flat surface.

12. A method of providing relatively frictionless lubrication to a hydro-gaseous bearing, comprising:
    (A) maintaining a liquid in the spheroidal state between two coacting bearing surfaces, thereby;
    (B) creating a vapor interface between the surfaces, providing relatively frictionless lubrication therebetween.

13. The method as described in claim 12, further comprising:
    (C) moving one of the bearing surfaces relative to the other.

14. The method as described in claim 12, further comprising:
    (C) heating one of the surfaces to a temperature sufficient to heat the liquid to the spheroidal state.

15. The method as described in claim 12, further comprising:
    (C) applying a load to one of the surfaces;
    (D) maintaining the liquid under pressure thereby supporting the load.

16. A method of providing relatively frictionless lubrication to a hydro-gaseous bearing, comprising:
    (A) rotating the bearing journal relative to the bearing outer shell;
    (B) maintaining a liquid between the journal and shell;
    (C) heating the liquid to the spheroidal state, thereby;
    (D) creating a vapor interface between the journal and shaft providing relatively frictionless lubrication therebetween.

17. The method as described in claim 16, further comprising:
    (E) applying a load to the journal;
    (F) maintaining the liquid under pressure thereby supporting the load.

18. The method as described in claim 16, further comprising eccentrically rotating the journal relative to the shaft.

References Cited

UNITED STATES PATENTS

| | | | |
|---|---|---|---|
| 115,365 | 5/1871 | Shaw | 308—9 |
| 2,293,037 | 8/1942 | Atlee | 308—241 |

MARTIN P. SCHWADRON, *Primary Examiner.*

F. SUSKO, *Assistant Examiner.*